Patented Feb. 6, 1940

2,189,648

UNITED STATES PATENT OFFICE 2,189,648

PRODUCTION OF NITROGEN-CONTAINING CONDENSATION PRODUCTS USEFUL IN THE TEXTILE AND RELATED INDUSTRIES

Fritz Guenther, Ludwigshafen-on-the-Rhine, and Hans Haussmann, Mannheim, Germany, assignors to I. G. Farbenindustrie Aktiengesellschaft, Frankfort-on-the-Main, Germany No Drawing. Application February 4, 1936, Serial No. 62,378. In Germany February 18, 1933

14 Claims. (Cl. 260—295)

The present invention relates to a process for the production of nitrogen-containing condensation products suitable as assistants in the textile and related industries.

We have found that very valuable condensation products suitable as assistants in the textile, leather or paper industries for example as wetting, sizing, emulsifying and like agents can be obtained by causing an aliphatic carboxylic amide having a high molecular weight and at least one hydrogen atom attached to nitrogen, a formaldehyde substance, sulphurous acid and a tertiary amine to react in any desired sequence to one another at elevated temperature, preferably in the presence of condensing agents.

Carboxylic amides suitable for the present process are for example those derived from the fatty acids contained in vegetable or animal oils, fats and waxes, resins, carboxylic acids obtainable by the oxidation of paraffin wax, mineral oils, hydrogenation products of coals, tars and the like or their derivatives, such as halogenation products and ammonia or primary amines, such as methyl amine, ethyl amine or aniline. Formaldehyde substances are for example formaldehyde itself, paraformaldehyde, or substances yielding formaldehyde, such as formaldehyde bisulphite. The sulphurous acid may be employed in gaseous form or in the form of aqueous solutions or in the form of their water-soluble salts, such as sodium bisulphite or ammonium bisulphite, etc.

Tertiary amines suitable for the present process are for example trimethylamine, triethyl amine, pyridine quinoline and the like.

The reaction of the carboxylic amides with formaldehyde substances and sulphurous acids and the tertiary amine is carried out at moderately elevated temperatures, the elevation of which depends on the reactivity of the initial materials used. Generally speaking temperatures of from about 70 to 110°, preferably of about 100° C. are sufficient. In many cases it is preferable to carry out the reaction in the presence of diluents or solvents and of condensing agents. The tertiary amines react with the condensation products and thus yield valuable products. In many cases it is of special advantage to carry out the reaction of the amides with the formaldehyde substance, the tertiary amine and the sulphurous acid in one working operation. Methylol-amide compounds obtained in other ways also yield the same valuable products as carboxylic amides and formaldehyde substances by reaction with sulphurous acid and the tertiary amines.

When using for instance tertiary heterocyclic bases in the process described products of the following constitution are obtained:

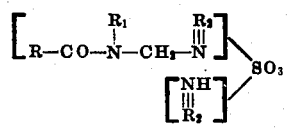

wherein R stands for an aliphatic radical containing at least 7 carbon atoms, $R_1$ stands for a hydrogen atom or a low molecular aliphatic radical and $N\equiv R_2$ stands for a tertiary heterocyclic nitrogen base.

The products obtainable according to this invention may be used, according to their properties, as softening, sizing, washing, cleansing or emulsifying agents, as impregnating agents for rendering fabrics waterproof, and as wetting agents for many branches of domestic or industrial requirements, in particular for the textile, paper and leather industries. The products may also be used together with other washing, wetting and dispersing agents; among these may be mentioned for example soaps, Turkey red oils, sulphuric esters of higher alcohols, true sulphonic acids or sulphuric esters of organic compounds or their esters and amides. Other additional substances, as for example glue, gum arabic, organic solvents, salts, as for example Glauber's salt, magnesium sulphate and sodium acetate, and bleaching agents, as for example compounds which split off oxygen or halogen, may also be employed.

The following examples will further illustrate the nature of this invention but the invention is not restricted to these examples. The parts are by weight.

Example 1

40 parts of oleic acid amide are dissolved in 200 parts of pyridine and 20 parts of paraformaldehyde are added to this solution. The mixture is heated at 100° C. under reflux while stirring and leading in sulphur dioxide until a sample withdrawn dissolves in water giving a clear solution; this is the case after about 2 hours. The product is then separated from the excess of paraformaldehyde and the pyridine present distilled off preferably in vacuo. A product is obtained which dissolves in water giving a clear solution and which has an excellent washing, wetting and emulsifying power.

Example 2

25 parts of palmitic acid methylamide are dissolved in 100 parts of pyridine and 10 parts of paraformaldeyde are added; sulphur dioxide is then led in for from about 2 to 3 hours at 100° C. while stirring under reflux, until the reaction product is soluble in water. The product is then separated from pyridine and from excess of formaldehyde. A product which is eminently suitable for softening textiles is thus obtained.

Example 3

100 parts of lauric acid amide are dissolved in 100 parts of triethylamine and 40 parts of paraformaldehyde are added to the solution. The whole is heated at 90° C. while stirring and leading in sulphur dioxide until the reaction product has become soluble in water; this is the case after from 3 to 4 hours. The excess of amine is then distilled off. The aqueous solution remaining as the residue has a good foaming, wetting and washing power.

Example 4

20 parts of paraformaldehyde are added to a solution of 100 parts of lauric acid amide in 200 parts of pyridine. Sulphur dioxide is lead into this solution while stirring at 100° C. until the product has become soluble in water. After removing the excess of formaldehyde by the use of a vacuum and after distilling off the excess of pyridine, a colorless jelly-like mass is obtained the aqueous solutions of which have a good foaming power.

What we claim is:

1. The process for the production of condensation products suitable as assistants in the textile and related industries which comprises causing oleic amide to react with paraformaldehyde and sulphurous acid in the presence of pyridine at about 100° C.

2. The process for the production of condensation products suitable as assistants in the textile and related industries which comprises causing palmitic methyl amide to react with paraformaldehyde and sulphurous acid in the presence of pyridine at about 100° C.

3. The process for the production of condensation products suitable as assistants in the textile and related industries which comprises causing lauric acid amide to react with paraformaldehyde and sulphurous acid in the presence of pyridine at about 100° C.

4. A new substance suitable as assistant in the textile and related industries comprising a compound of the formula

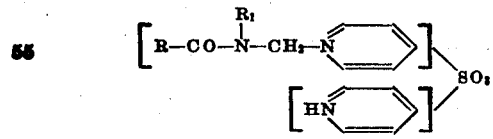

wherein R stands for an aliphatic radicle containing at least 7 carbon atoms, and $R_1$ stands for a member of the group consisting of hydrogen and a low molecular aliphatic radicle.

5. A new substance suitable as assistant in the textile and related industries comprising a compound of the formula

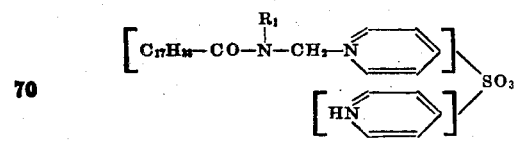

wherein $R_1$ stands for a member of the group consisting of hydrogen and a low molecular aliphatic radicle.

6. A new substance suitable as assistant in the textile and related industries comprising a compound of the formula

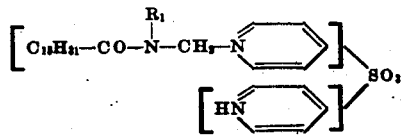

wherein $R_1$ stands for a member of the group consisting of hydrogen and a low molecular aliphatic radicle.

7. A new substance suitable as assistant in the textile and related industries comprising a compound of the formula

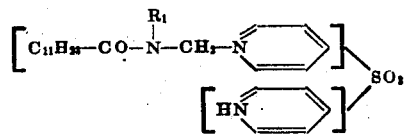

wherein $R_1$ stands for a member of the group consisting of hydrogen and a low molecular aliphatic radicle.

8. As a new article of manufacture suitable for application in the textile and related industries a compound of the formula:

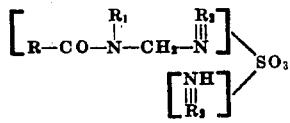

wherein R stands for an aliphatic radical containing at least 7 carbon atoms, $R_1$ stands for a member of the group consisting of hydrogen and a low molecular aliphatic radical and $N \equiv R_2$ is a tertiary heterocyclic nitrogen base.

9. As a new article of manufacture suitable for application in the textile and related industries a compound of the formula:

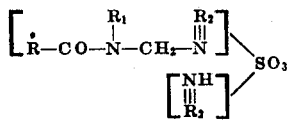

wherein R stands for a saturated aliphatic radical containing at least 7 carbon atoms, $R_1$ stands for a member of the group consisting of hydrogen and a low molecular aliphatic radical and $N \equiv R_2$ is a tertiary heterocyclic nitrogen base.

10. The process for the production of condensation products suitable as assistants in the textile and related industries which comprises causing an aliphatic carboxylic amide containing at least 8 carbon atoms and at least one hydrogen atom attached to nitrogen, a formaldehyde substance, a substance selected from the class consisting of sulphurous acid and its water-soluble salts, and a tertiary amine to react in any desired sequence with one another at a temperature of at least about 70° C.

11. The process for the production of condensation products suitable as assistants in the textile and related industries which comprises causing an aliphatic carboxylic amide containing at least 8 carbon atoms and at least one hydrogen atom attached to nitrogen, formaldehyde, a substance selected from the class consisting of sulphurous acid and its water-soluble salts and a tertiary amine to react in any desired sequence with one another at a temperature of at least about 70° C.

12. The process for the production of condensation products suitable as assistants in the textile and related industries which comprises causing an aliphatic carboxylic amide containing at least 8 carbon atoms and at least one hydrogen atom attached to nitrogen, polymeric formaldehyde, a substance selected from the class consisting of sulphurous acid and its water-soluble salts and a tertiary amine to react in any desired sequence with one another at a temperature of at least about 70° C.

13. The process for the production of condensation products suitable as assistants in the textile and related industries which comprises causing an aliphatic carboxylic amide containing at least 8 carbon atoms and at least one hydrogen atom attached to nitrogen, polymeric formaldehyde, a substance selected from the class consisting of sulphurous acid and its water-soluble salts and a tertiary heterocyclic nitrogen base to react in any desired sequence with one another at a temperature of at least about 70° C.

14. The process for the production of condensation products suitable as assistants in the textile and related industries which comprises causing an aliphatic carboxylic amide containing at least 8 carbon atoms and at least one hydrogen atom attached to nitrogen, polymeric formaldehyde, a substance selected from the class consisting of sulphurous acid and its water-soluble salts and pyridine to react in any desired sequence with one another at a temperature of at least about 70° C.

FRITZ GUENTHER.
HANS HAUSSMANN.